March 26, 1963 G. JAY ET AL 3,082,588
METHOD OF PREPARING HAY FOR SHIPMENT
Filed March 9, 1959 3 Sheets-Sheet 1

INVENTORS
George Jay
Everett V. Rankins
BY

March 26, 1963
G. JAY ET AL
3,082,588
METHOD OF PREPARING HAY FOR SHIPMENT
Filed March 9, 1959
3 Sheets-Sheet 2
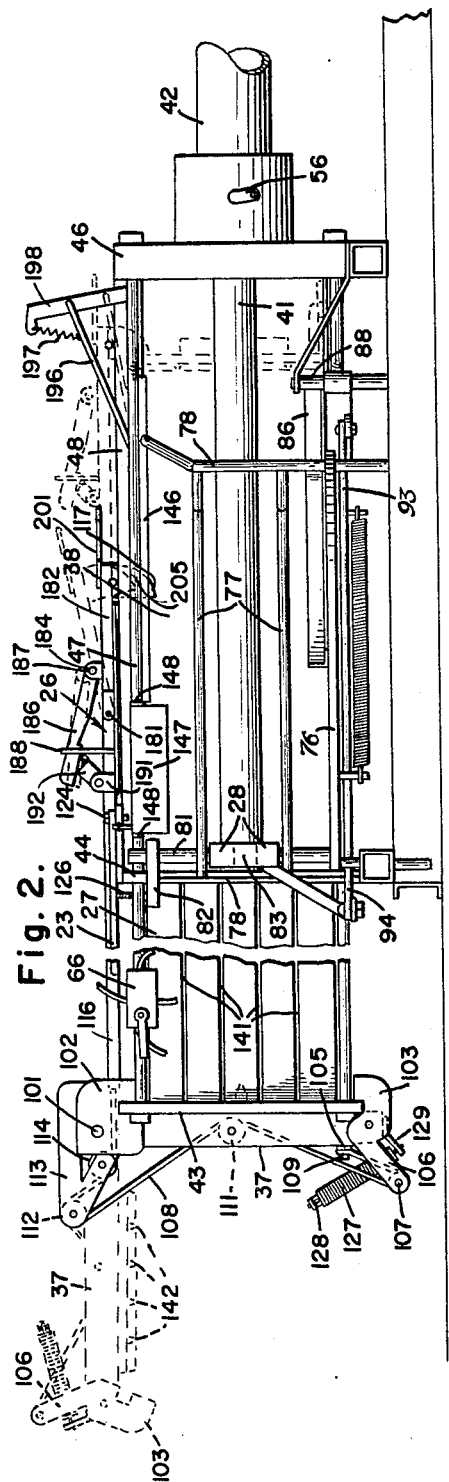
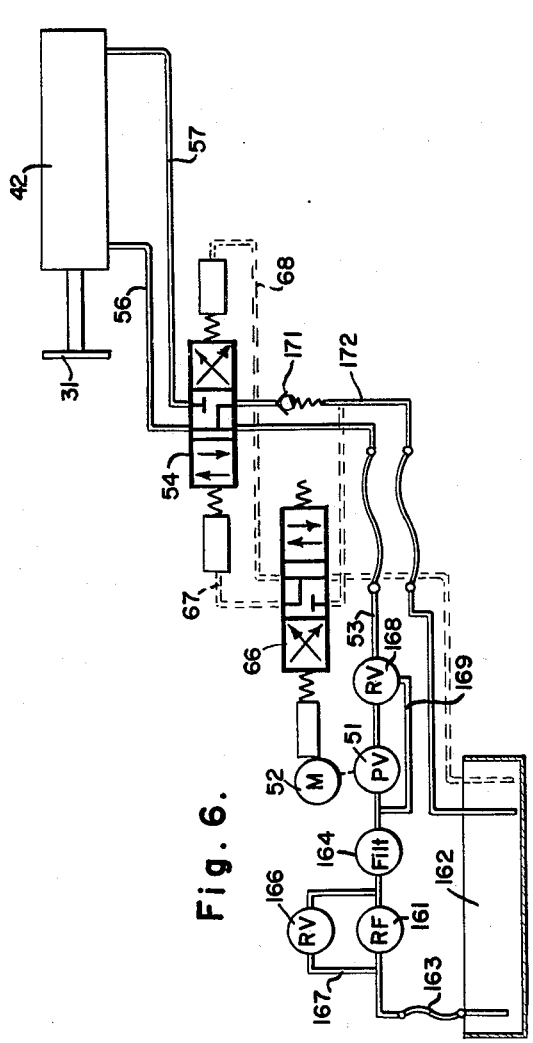
INVENTOR
George Jay
Everett V. Rankins
BY *Julian Caplan*
*attorney*

March 26, 1963
G. JAY ET AL
3,082,588
METHOD OF PREPARING HAY FOR SHIPMENT
Filed March 9, 1959
3 Sheets-Sheet 3
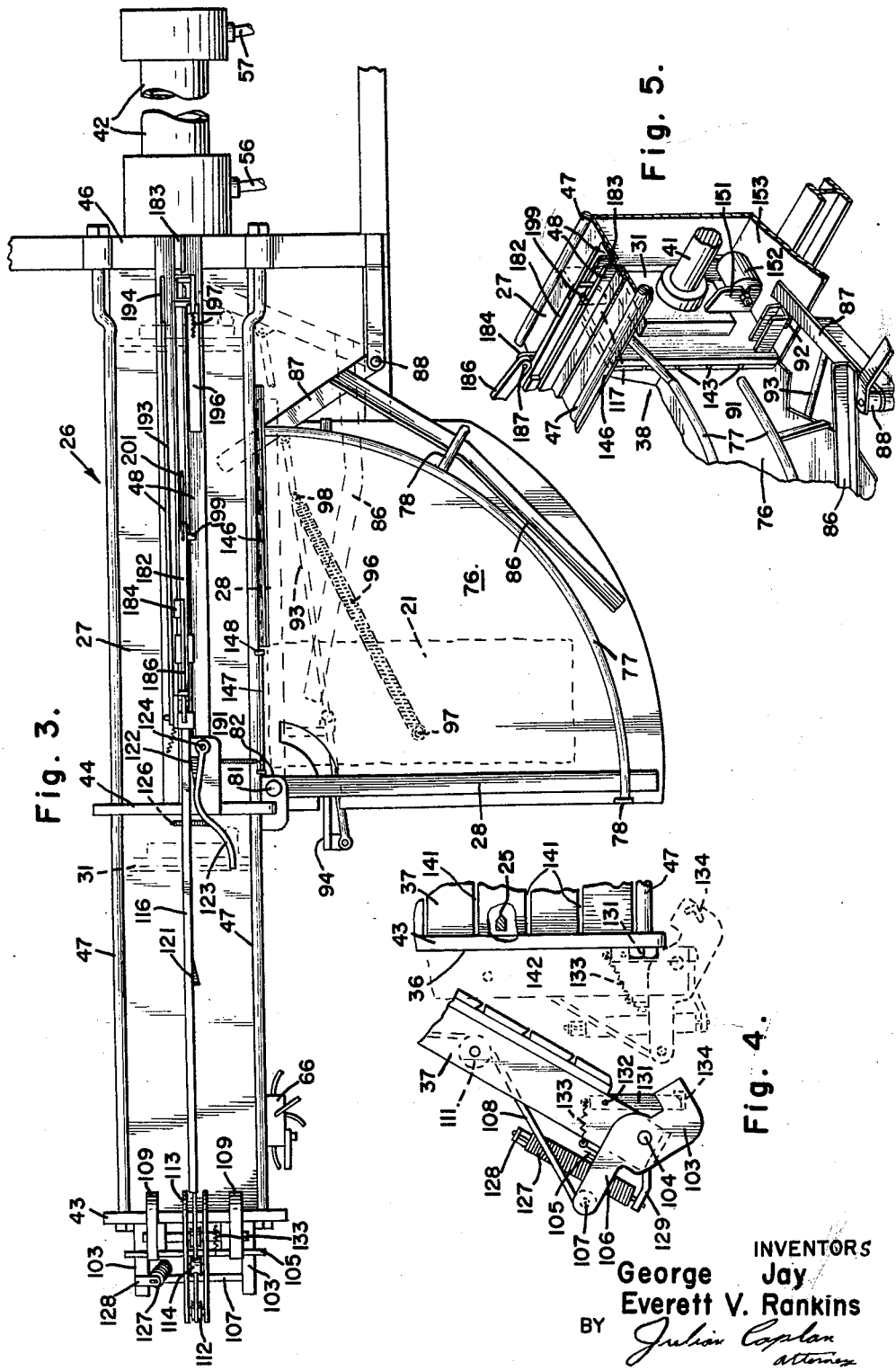
INVENTORS
George Jay
Everett V. Rankins
BY 3,082,588
METHOD OF PREPARING HAY FOR SHIPMENT
George Jay, 602 Merle Lane, and Everett V. Rankins, 904 Trinity St., both of Manteca, Calif.
Filed Mar. 9, 1959, Ser. No. 797,932
1 Claim. (Cl. 56—1)

This invention relates to a new and improved machine for rebaling hay and to a method of baling hay and the product thereof.

In certain regions of the world a surplus of hay exists whereas in other regions, cattle raising is impeded by a shortage of hay. The light weight of hay baled by customary methods results in unfavorable freight rates which make long distance transportation of hay by rail, truck, or steamship uneconomic.

Various methods have been proposed for compressing hay to a higher density than by standard hay baling machines. However, most of these methods require chopping the hay prior to baling. Experience has shown that chopping hay is undesirable for cattle because cows prefer to chew longer pieces of hay in their cud and the use of shorter pieces results in lower milk production and may lead to digestive disturbance. Further, short particles tend to produce fat on the cattle rather than butter fat in the milk.

Ordinary hay when cut, ranges in length from 6 to 30 inches and is predominantly 15 inches or longer, and these lengths are likewise maintained in the bale.

One of the features of the present invention is the fact that the hay is baled in its original length without chopping and hence more nearly approaches the condition of the grass when cattle graze in the field.

Other processes heretofore employed have compressed hay into bricks which must be broken up before the cattle can digest them. Such processes produce a hard compacted cake which is difficult to digest and generally unsatisfactory for continuous use. The pressures employed in the present invention do not result in the formation of a compacted mass but on the contrary result in a hay which is substantially identical with the condition of the hay at the time of baling. Thus when the baling wires are cut, the bale of the present invention can be broken open with a pitch fork without difficulty and the cattle can handle the material as readily as unbaled hay.

Other processes of baling hay have used additives, such as molasses, in order to hold the bale together. The present invention does not require the use of additives which are expensive and require special equipment for their handling. On the other hand, additives may be incorporated in the bale, if desired.

A further advantage of the present invention is the fact that the hay is cured in the field and thoroughly dried by natural process. This prevents the formation of mildew or musk in the bale but does not require the use of special drying equipment.

Accordingly, the present invention provides a bale which has several times the density of an ordinary bale of hay but which is in all other respects identical with unbaled hay or hay baled by conventional methods. The original characteristics and advantages of the hay are maintained.

The bale produced in accordance with this invention supplies the roughage which cattle require for satisfactory nutrition. The bale is in a form which may be economically transported for relatively long distances by reason of its weight ratio and yet has all of the beneficial characteristics of conventional hay.

Hay baled by conventional baling methods has cross-sectional dimensions of 17 by 22 inches and a length which reaches between 42 and 48 inches. Such a bale weighs approximately 125 lbs. The bale is formed in conventional baling machines and is made up of laminations which correspond to the several charges of hay which are fed into the baling column by reciprocation of the baling plunger.

In accordance with this invention, conventional bales are rebaled in a rebaling machine until the volume of the original bale is reduced to about 40% of its original condition and the density is correspondingly increased. However, the original laminations of the baled hay are maintained, which is very desirable in that it facilitates feeding cattle.

As a further feature of the invention is the fact that as the rebaled bales are discharged from the baling column, they are preferably sliced longitudinally by a blade fixed in the discharge end of the baling column to produce two bales. The rebaled bale is forced from the column past the blade and thus automatically sliced in two.

Thus, assume that the original bale has been compressed prior to discharge from the column to a size 18½" by 23½" and a length of 20" with a weight of 125 lbs. The blade slices the rebaled bale into two half-bales, each 18½" by 12" with a length of 20" and a weight of approximately 62½ lbs. Each half-bale is held together by two baling wires, the four wires being installed in the column before the bale is sliced.

This method and the bale produced thereby provides a bale which is conveniently handled, from the standpoint of size and weight. Further, slicing the bale produces two extremely smooth, flat surfaces, which are ideal for stacking bales one on the other.

In accordance with the present invention, two conventional bales are fed in as close to their original condition as possible into a high pressure baling column which reduces the combined length to about 40 inches and increases the cross-sectional area only slightly, i.e. 18½ by 23½ inches. Thus the density of the hay is over twice that of conventional bales. However, the original laminations of the baled hay are maintained which is desirable from feeding standpoint.

As the combined bales are discharged from the baling column they are preferably sliced longitudinally by a knife to produce two bales each approximately 11¾ by 18½ by 40 inches and each weighing about 125 to 150 lbs. Each bale is held together by two baling wires, the four wires being installed in the column before the bale is cut.

One principal advantage of this baling method is the fact that whereas in all hay bales the ends tend to bulge out, this method eliminates two bulging ends by doubling the length. This facilitates stacking the bales and enables bales to be stored in a smaller space thereby reducing transportation, handling, and warehouse costs. Further facilitating transportation, handling and warehousing is the fact that the slicing of the bale produces two extremely smooth, flat surfaces which are ideal for stacking of bales one on the other.

Compressing two bales end to end has a further economy in that the pressure applied to the baling ram must be increased to maximum only half as often, thereby speeding production and reducing power costs.

Another advantage of the foregoing method is the fact that the time and labor involved in applying baling wires is reduced and the quantity of wire is likewise reduced.

In accordance with a modification of the present invention, two conventional bales are fed in as close to their original condition as possible into a high pressure baling column which reduces the combined length to about 40 inches and increases the cross-sectional area only slightly, i.e. 18½ by 23½ inches. One principal advantage of this baling method is the fact that whereas in all hay bales the ends tend to bulge out, this method eliminates two bulging ends by doubling the length. This facilitates stacking the bales and enables bales to be stored in a smaller space thereby reducing transportation, handling and warehouse costs.

Compressing two bales end-to-end has a further economy in that the pressure applied to the baling ram must be increased to maximum only half as often, thereby speeding production and reducing power costs.

Another advantage of the foregoing modified method is the fact that the time and labor involved in applying baling wires is reduced and the quantity of wire is likewise reduced.

Other objects of the present invention will become apparent upon reading the following specification and referring to the accompanying drawings in which similar characters of reference represent corresponding parts in each of the several views.

In the drawings:

FIG. 1a is an enlarged side elevation of a conventional hay bale produced in accordance with FIG. 1.

FIG. 1b is an end elevation of the bale of FIG. 1a.

FIG. 1c is a schematic side elevation showing transportation of bales according to FIGS. 1a and 1b to a central point for rebaling.

FIG. 2 is a side elevation of the rebaling machine showing the tail gate closed and the ram projected in full lines and the tail gate open and ram retracted in dotted lines.

FIG. 3 is a top plan showing the arms which move the bale into the column in retracted position in full lines and in projected position in dotted lines.

FIG. 4 is a fragmentary side elevation of the tail gate showing the gate partially open in full lines and closed but unlatched in dotted lines.

FIG. 5 is a fragmentary perspective view of a portion of the mechanism.

FIG. 6 is a schematic piping diagram of the hydraulic system.

Figure 1:
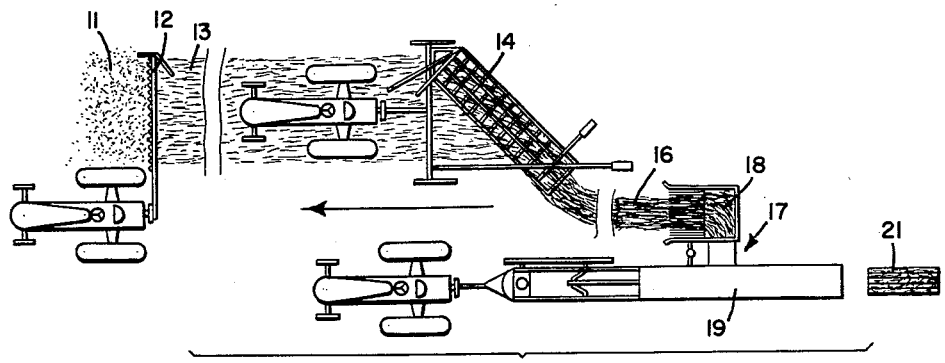
FIG. 1 is a schematic top plan view showing the first steps of the method of the present invention, namely, mowing, raking and curing in the field and baling.
Figures 1A, 1B, 1C:
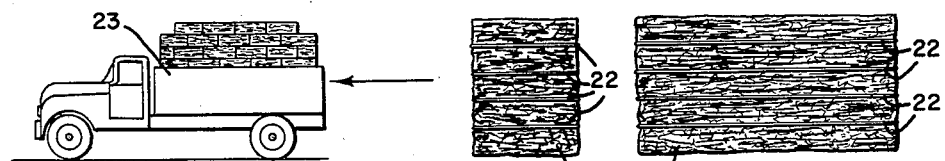
Figures 1D, 1E:
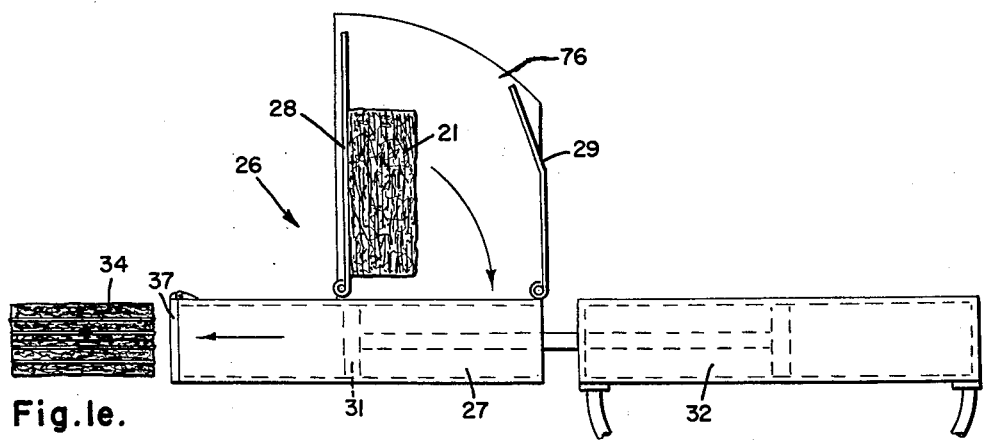
FIG. 1d is a schematic top plan view showing rebaling of bales of FIGS. 1a and 1b to produce a compact bale.
FIG. 1e is a side elevation of a bale as rebaled in FIG. 1d.
Figures 1F, 1G:
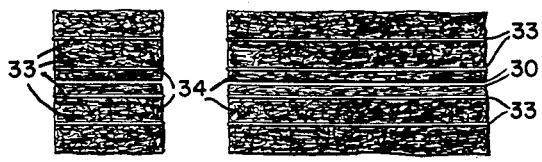
FIG. 1f is an enlarged side elevation of a pair of bales produced in accordance with this invention, said bales being produced from two of the bales shown in FIG. 1a compressed end-to-end and sliced longitudinally.
FIG. 1g is an end elevation of the pair of bales of FIG. 1f.

The method of the present invention is illustrated in accompanying FIGS. 1 to 1f. Thus, a crop 11 such as alfalfa standing in the field is cut by means of a mowing machine 12 and the curing process is begun. The pieces of mown crop 13 are usually of a length of between 6 and 30 inches and primarily 15 inches and longer. The mown crop 13 is raked by rake 14 into a windrow 16 and the windrow turned from time to time if required. A conventional portable baling machine 17 picks the hay up from the windrow and feeds it from a hopper 18 in small charges into the baling column 19, where it is baled (FIG. 1) in the form of a bale 21 weighing approximately 125 lbs. and having dimensions approximately 17 by 22 and a length of 42 to 48 inches (FIGS. 1a, 1b). Baling wires 22 hold the bale in shape. The bales 21 are transported by truck 23 (FIG. 1c) to a central location where they are preferably stored for a considerable length of time, if desired. The bales 21 are maintained in their original condition prior to deposit in the rebaling machine. The bales are deposited in the rebaling machine 26 and the original baling wires 22 are removed. The bale 31 is pushed in the baling column 27 by arms 28 and 29 substantially in its original condition, i.e. the bale is not broken up. Pressure is applied to the baling ram 31 by cylinder 32 which reduces the length of the bale (FIG. 1d). After compression, new baling wires 33 are applied two on the top and two on the bottom. On the next stroke of ram, the bale is pushed out of column 27 and as it passes blade 25 horizontally disposed at the end of column 27, knife 25 slices the bale into two bales each 11¾ by 18½ by 20 inches. The cut surfaces 30 are very smooth and flat and enable the bales to be stacked readily. The weight of 60 to 75 lbs. enables one man to handle the bales. The recompressed bale 34 of a density of at least twice of the original bale 21 is produced. Thus each bale 34 produced in accordance with the present invention has a density of about 0.014 to 0.017 lb. per cubic inch as against the density of the original bale 21 of about 0.007 lb. per cubic inch. In all other essential respects the hay is in its original condition.

As an alternative, slicing the rebaled bale is eliminated by removing blade 25.

A further modification of the invention involves compressing two bales end-to-end. Thus, after the first bale 21 is compressed, ram 31 retracts and a second bale similar to the first is inserted in the column 27 behind the first and a high pressure applied until the length of the two bales is reduced to about 40 inches. Four new baling wires 33 are applied. On the next stroke of ram 31, the double bale is pushed out of the column and preferably sliced by blade 25 to form two bales, each 11¾ by 18½ by 40 inches having cut surfaces 30 which are smooth and flat. The weight of the bale is 125 to 150 lbs. This form of the invention is illustrated in FIG. 1e and FIG. 1f.

The freight rate for transportation of a bale 34 produced by the present invention is considerably more economical than conventional baled hay. This enables hay to be shipped from areas of surplus such as the Central Valley of California to areas of shortage such as Hawaii, Philippine Islands, the east coast of the United States and numerous other parts of the world. The raising of cattle and other live stock in regions where such live stock raising has not heretofore been feasible on a large scale is thus encouraged.

In the following description of the baling machine, equipment to compress two bales end-to-end is described. However, the equipment may be simplified to handle only a single bale 21.

The baling machine 26 which is the subject of the present invention is illustrated in detail in FIGS. 2 to 6. The baling column 27 is formed with an open discharge end 36 closed by a tail gate 37 as hereinafter described in detail. The column 27 is a heavy metal member which in cross-section is of a dimension slightly greater than the dimensions of the bale to be handled, i.e. for a bale having the initial dimensions of 17 by 22 inches, the interior dimensions of the column are 18 by 23 inches. Spaced forwardly from the discharge end of the column a distance approximately 40 inches or the length of the compressed bale 34, the side of the column is formed with an opening 38 through which the bale 21 initially is inserted. A ram 31 reciprocates in the column and has an elongated stroke. Ram 31 is maintained on the outer end of piston rod 41 of hydraulic cylinder 42 which is in line with the baling column 27. To facilitate movement of ram 31 it is provided with brackets 151 which support roller 152 on the back of the ram to roll on the bottom 153 of the column. Because of the high pressure employed, it is essential that the column 27 be properly reinforced. Hence for such purpose, a reinforcing frame 43 is formed around the discharge aperture 36, a second frame 44 at the rearward end of aperture 38 and a third frame 46 at the forward end of the column. Frame 46 is fixed to cylinder 42. Heavy tie rods 47 extend longitudinally and connect frame members 43, 44 and 46. This construction relieves the frame of a considerable portion of the baling pressure. Additional reinforcement is provided by longitudinal angle bars 48 on the top of the column.

To assist in guiding bale 21 through opening 38, downwardly-inwardly sloping guide plate 146 is fixed to the top of column 27 adjacent the forward end of opening 38. Auxiliary guide plate 147 is pivotally mounted on column 27 about a longitudinal horizontal axis by brackets 148. Auxiliary plate 147 pivots to a downwardly-inwardly sloping position substantially co-planar with plate 146 when bale 21 is being inserted in the column. When insertion is completed, auxiliary plate 147 swings down to the position shown in FIG. 2 and serves to prevent hay from falling out of the column while recompression is taking place.

The hydraulic system actuating ram 31 consists of a high pressure cylinder type hydraulic pump 51 producing a pressure of 4000 p.s.i. at a capacity of 35 gallons per minute. Inasmuch as the piston in cylinder 42 has a 7 inch diameter, a pressure of 55 to 80 tons may be exerted on ram 31. Pump 51 is driven by a motor 52 which desirably should have 100 H.P. A booster pump 161 drives fluid from reservoir 162 through line 163 and drives the fluid through filter 164 to the intake of pump 51. A relief valve 166 and by-pass line 167 are installed as well understood in this art. Similarly relief valve 168 and by pass line 169 are installed on the discharge side of pump 51. The output of pump 51 passes through line 53 to control valve 54 and thence by means of lines 56 or 57 to the power or return stroke side of cylinder 42. The discharge from cylinder 42 passes through line 56 or 57, check valve 171, line 172, valve 54 to reservoir 162. Control valve 54 is in turn controlled by pilot valve 66 located near the discharge end of the baling column. Pilot valve 66 is manually operated by the operator to reverse the direction of ram 31 or hold the same stationary. Hydraulic lines 67—68 interconnect pilot valve 66 and control valve 54 in a manner well understood in this art. Control valve 54 may be of a type well known such as Rivett Model 6857 PSO 1. Pilot valve 66 may be Rivett Model 6153 PSO ¼. It will be understood that the hydraulic system is subject to considerable variation in the choice and arrangement of parts.

Adjacent and below opening 38 in the side of baling column 27 is a horizontally disposed table 76 which in plan is quadrant shaped. A bale of hay 21 is disposed on table 76 in a direction transverse to the baling column 27. Bale 21 is prevented from falling off table 76 by arcuate horizontal guides 77 supported by posts 78. The operator removes the original baling wires 22 after the bale is disposed on the table 76 but prior to its being fed into the column 27. As the ram 31 approaches the end of its return storke, the bale 21 is automatically fed into the column 27. For such purpose, a pair of horizontally swingable pushing arms 28 which are shown as hollow square members oscillate about the axis of a vertical shaft 81 located along the side of the baling column 27 near the rearward end of opening 38 and supported thereon by means of pillow blocks 82. The outer ends of arms 28 are interconnected by vertical connector 83. To assist in feeding the bale 21 endwise into the column, a horizontal kicker arm 86, which is shown in the drawings as dog-leg shaped in plan, is attached to crank 87, pivots about vertical axis 88 located in the side of the baling column adjacent the forward end of opening 38.

Crank 87 projects into the opening 38. Ram 31 is provided with a forwardly extending projection 91 which carries a roller 92 which engages the end of crank 87 and swings kicker 86 inwardly rearwardly. Connecting rod 93 interconnects crank 87 on shaft 81 with a crank 94 on shaft 88 and thus the swinging movement of kicker arm 86 is likewise transmitted to the pusher arms 28. It will be seen that as the ram 31 moves on its return stroke, roller 92 engages crank 87 and causes the arms 86, 28 and 29 to oscillate. The arms are returned to initial position by spring 96 anchored at one end by means of pin 97 to the under side of platform 76 and at the other end by pin 98 to connecting rod 93.

The tailgate 37 for the open end 36 of column 27 is pivoted by means of horizontal pin 101 to brackets 102 at the top edge of the column. A pair of latch dogs 103 having the shape shown in FIGS. 2 and 4 are pivoted by means of horizontal pivots 104 located at the lower edge of gate 37. Dogs 103 are so shaped that when in latching position, they engage behind reinforcing frame 43 and hold the gate closed. Latch dogs 103 are formed with projecting arms 106 interconnected by transverse rod 107. An unlatching cable 108 is fixed by means of eye 109 to gate 37 above transverse rod 107. Cable 108 passes beneath rod 107 and up over pulley 111 adjacent the middle of gate 37 and thence up over pulley 112 suspended from rearwardly extending support arms 113 above the top of column; thence around pulley 114 and thence is connected to the rearward end of horizontally slideable control arm 116 maintained for reciprocation on the top of column 27. Connected to the forward end of control arm 116 by pin 181 is a pivoted dog 182 which projects down through slot 183 in the top of the baling column and is engaged by the forward end of ram 31 during certain portions of the cycle of the machine. Projection 184 on dog 182 carries latch 186 pivoted thereto by pin 187. Latch 186 at certain portions of the cycle of the machine latches with projection 188 on the end of arm 116 and in such position holds dog 182 elevated out of slot 183 (i.e., in the dotted line position of FIG. 2). Stationarily mounted on the top of column 26 is a projection 191 which carries pivoted unlatching lever 192 connected to rod 193 which extends forwardly of column 26 and fits down through opening 194 so that when the ram is fully forward rod 193 is pulled to lift lever 192 to unlatch latch 186 from projection 191. Pivoted on column 26 is a ramp 196 biased upward by spring 197 connected to bifurcated bracket 198. Dog 182 carries a roller 199 which engages ramp 196 and depresses it against the force of spring 197 at the end of the forward stroke of the ram 31. As soon as ram 31 starts its rearward or power stroke, spring 197 lifts ramp 196 and dog 182 thus causing latch 186 to engage projection 188 and hold the dog up out of contact with ram 31 until rod 193 unlatches the dog. A forward projecting rod 201 on dog 182 fits between the bifurcations of bracket 198 and prevents dog 182 from over-pivoting when spring 197 causes it to lift. When the dogs 103 are unlatched their levers 106 come in contact with abutment 105 on gate 37 and hence continued pulling of chain 108 pulls gate 37 up to open position.

The gate 37 is latched in full open position by means of interengaging latches 121 and 122 on control rod 116 and handle 123 respectively. Handle 123 is a lever of the third class pivoted about vertical axis 124 mounted on column 27 forwardly of the point of contact of latches 121 and 122 and is biased toward latched position by spring 126. The latches when engaged hold gate 37 open. This is important in that the commencement of the working stroke of ram 31 is employed to force the previous bale out of the column through the open gate. As soon as the previous bale has been forced out, the operator pulls handle 123 which disengages latches 121 and 122 and thus releases control rod 116 and chain 108 and allows the gate to swing closed. The gate closes with considerable force and any hay which may be lodged in the opening of the column is sheared off by the rapid, forceful movement of the gate closing.

Spring 127 interconnects extensions 128 and 129 on lever 106 and gate 37, respectively and thus biases dogs 103 to closed position. To prevent damage when the gate swings closed, latch dogs 103 are latched in open position. For such purpose, auxiliary latch 131 pivoted to gate 37 by pin 132 is biased counterclockwise (as viewed in FIG. 4) by means of spring 133 and contacts abutment 134 on latch dog 103 and holds the latter open.

When gate 37 closes, reinforcing frame 43 comes in contact with auxiliary latch 131 and forces it out of contact with abutment 134 and hence the latch dogs 103 close under the force of spring 127.

After the bale is formed, it is necessary to tie the same with baling wire 33. Various means may be employed for such purpose, and a manual means is illustrated herein. A plurality of horizontal slots 141 is formed in opposite sides of the baling column 37 adjacent the discharge end thereof. Slots 141 are of a length equal to that of the complete bale 34. Co-operating slots 142 are formed in the inner face of gate 37 and corresponding co-operative slots 143 are formed in the rearward face of ram 31. Thus an operator stationed on the side opposite platform 76 inserts the ends of baling wires 33 through the slots 143 and 142 in ram 31 and gate 37. The ends are caught by the operator on the near side and tied together. The slots 141 in the side of the column permit the wire to slip into the baling column.

In the operation of the rebaling machine, it is assumed that a rebaled bale (comprised to two bales 21) is compressed and tied in the baling chamber, gate 37 closed, dog 182 is down, and ram 31 has reached the end of its rearward (compression) stroke. A new bale 21 has been placed on platform 76. The operator thereupon manually actuates pilot valve 66 which moves control valve 54 to commence the forward (return) stroke of the ram. As ram 31 retracts it engages dog 182 thereby pulling control arm 116 and cable 108 to open gate 37 and lock latch dogs 103 open. As the ram retracts, arms 28 and 86 feed the next bale 21 into the baling column through opening 38. At the end of the forward stroke latches 121 and 122 engage to hold gate 37 open. Roller 199 rides on and depresses ramp 196.

Thereupon the operator manually actuates valve 66 to energize valve 54 to reverse ram 31 or this may be automatically unlatched by means well known in the art and not illustrated herein. Immediately thereafter, ramp 196 pivots up under action of spring 197 causing latch 186 to latch dog 182 upward. Continued movement of ram 31 moves the new bale rearward which pushes the rebaled bale already in the column out. Knife 25 slices the rebaled bale into two halves 34. As soon as bales 34 have been ejected, the operator moves handle 123, disengaging latches 121 and 122, thereby closing and latching the gate under the action of springs 127. A second bale 21 is placed on platform 76 while this is taking place and its wires 22 are severed.

On completion of the first compressive stroke of the ram the operator manually moves pilot valve 66 which starts the retraction of ram 31 which feeds the second bale 21 into the column through opening 38. Since dog 182 is latched upward, arm 116 and cable 108 are not moved and gate 37 remains closed. At the end of this stroke, ram 31 engages and pulls rod 193 which pivots lever 192 to unlatch latch 186 and drop dog 182.

By manual movement of pilot valve 66 or automatic means heretofore mentioned, valve 54 is again reversed and ram 31 commences its second compressive stroke.

As ram 31 passes dog 182, the latter pivots up to permit passage of the ram and then immediately drops down behind the ram, it being observed that the forward face 205 of dog 182 is curved for this purpose. This movement of ram 31 compresses the two bales 21, one behind the other, against gate 37 to form a recompressed bale of about 40% of the length of a single bale 21 and having a density as previously described. At the end of the stroke, baling wires 33 are inserted and tied as well understood in this art. The cycle of operation is then complete and a new cycle is ready to be initiated.

When desired, only a single bale 21 may be rebaled. Latch 186 is inactivated, as by removing pin 187. Thus, gate 37 opens on each compressive stroke of the ram and a bale of 20 inches in length produced.

When the machine is to be used solely for compressing single bales dog 182 may be fixed to arm 116 and all the mechanism which lifts dog 182 eliminated. Thus, the elements of the machine indicated by reference numerals 184 to 197 may be omitted. In this event, the length of column 27 and the stroke of cylinder 42 are preferably reduced.

It will be understood that the use of blade 25 may likewise be eliminated.

Although the foregoing invention has been described in some detail by way of illustration and example for purposes of clarity of understanding, it is understood that certain changes and modifications may be practiced within the spirit of the invention and scope of the appended claim.

We claim:

In the harvesting of forage crops, the steps of picking up and assembling said crop into separate laminations in juxtaposition, compressing said laminations in one direction to reduce the thickness of said laminations to form a bale of conventional direction and density, and further compressing said laminations in the same direction to form a bale of substantially one-half the length of said original bale, whereby to reduce storage and shipping space and still permit said bale to be opened and fed to stock in the usual way.

References Cited in the file of this patent

UNITED STATES PATENTS

| | | |
|---|---|---|
| Re. 8,130 | Dederick | Mar. 19, 1878 |
| 204,757 | Price | June 11, 1878 |
| 496,042 | Dederick | Apr. 25, 1893 |
| 739,838 | Crow | Sept. 29, 1903 |
| 764,924 | Dederick | July 12, 1904 |
| 1,257,559 | Webb | Feb. 26, 1918 |
| 1,710,942 | Nixon | Apr. 30, 1929 |
| 2,355,675 | Pryor et al. | Aug. 15, 1944 |
| 2,503,416 | Russell | Apr. 11, 1950 |
| 2,770,937 | Huddle | Nov. 20, 1956 |
| 2,812,708 | Tillinghast | Nov. 12, 1957 |
| 2,859,688 | Nolt | Nov. 11, 1958 |

FOREIGN PATENTS

| | | |
|---|---|---|
| 138,427 | Germany | Feb. 3, 1903 |